United States Patent Office 3,532,621
Patented Oct. 6, 1970

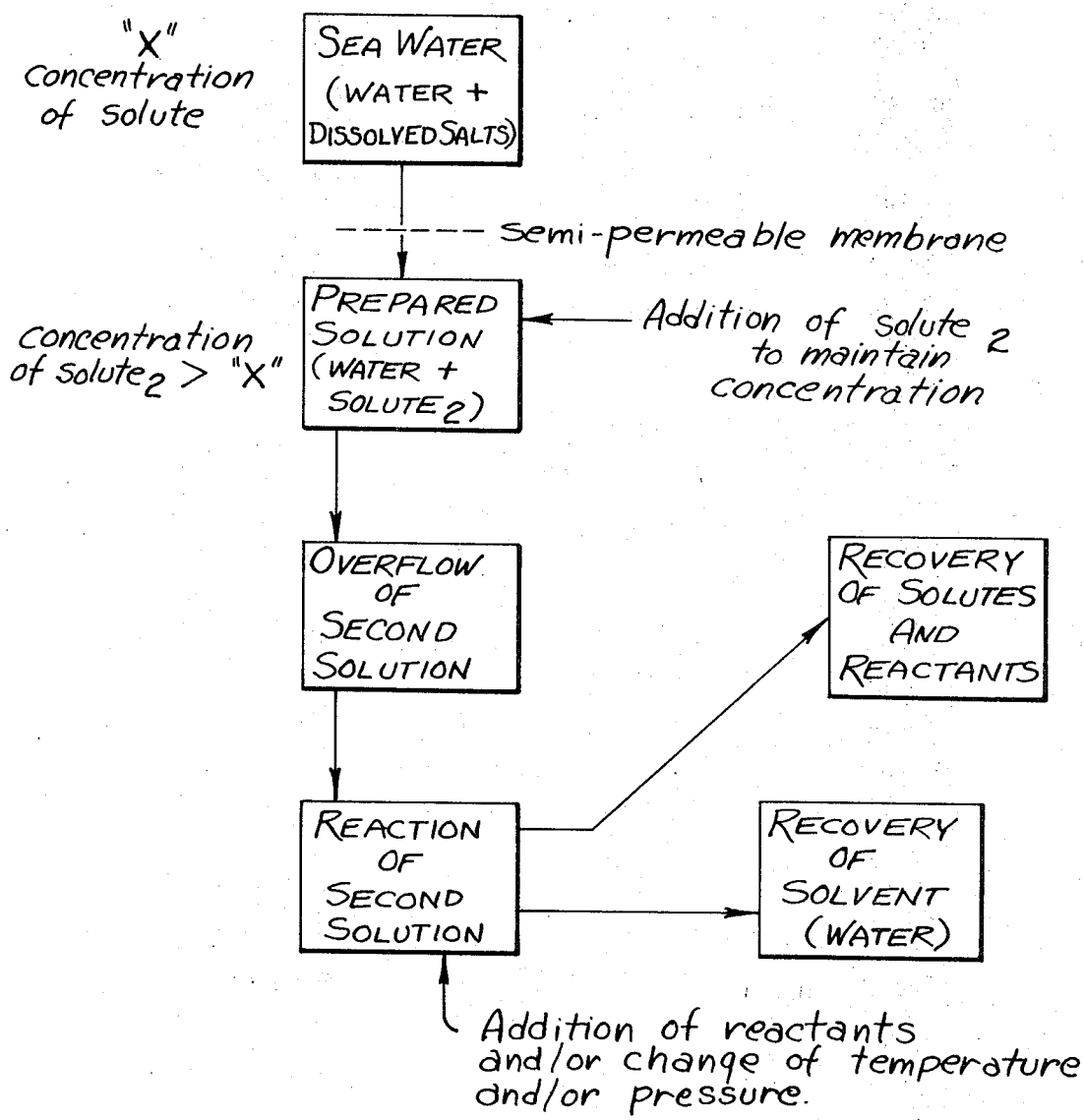

1

3,532,621
PROCESS FOR EXTRACTING SOLVENT FROM A SOLUTION
William Thomas Hough, 312 S. Finley Ave.,
Basking Ridge, N.J. 07920
Continuation-in-part of application Ser. No. 442,122,
Mar. 23, 1965. This application Feb. 26, 1969, Ser.
No. 813,376
Int. Cl. B01d 13/00
U.S. Cl. 210—22                                    26 Claims

ABSTRACT OF THE DISCLOSURE

A process for desalinization of sea water by osmosis of water from the sea water into a separable non-volatile solute in solution, and separation and isolation of the separable solute from the water extracted by osmosis from the sea water, whereby palatable water is producible.

---

This is a continuation-in-part of application U.S. Ser. No. 442,122 filed on Mar. 23, 1965 now abandoned.

This invention relates to a process by which the solvent of a solution may be recovered separate from the solute dissolved therein. More particularly, the invention relates to a process for recovering salt-free water from saline water or sea water from which it is desirable to separate the salt.

BACKGROUND

Within recent years, increases in population and the continued expansions of old industries and the development of new industries have cumulatively contributed to the growing need for new and inexpensive sources of both palatable water for drinking purposes and industrial water sufficiently free of salt and minerals in general normally found in sea water and other sources of saline water, to permit industrial use of the water.

Many diverse methods have been employed to obtain water which is free of objectionable salts.

Probably the oldest typical example is a process employing distillation. However, because of the great expense involved in the production of sufficient heat energy to obtain distillation, distillation as a method for providing large quantities of water over indefinite but extended periods of time has been impractical and unacceptable. In the absence of other more satisfactory and less expensive methods, it has been necessary in many cases to continue use of the expensive and inefficient distillation method.

Other typical methods currently being employed, but at great expense, are the ion-exchange and electrodialysis methods whereby the salt is withdrawn from the saline solution. Electrodialysis is a unit process that uses an induced electric current to separate the cationic and anionic components of a salt solution; it relies on use of membranes that permit ion passage from dilute to concentrated solution.

Another typical method that has been employed with very little practical success is the method sometimes referred to as reverse osmosis, in which tremendous pressures (such as up to about 350 pounds per square inch) are exerted on a saline solution having an osmotic membrane adjacent thereto and in intimate contact therewith whereby water is forced from the saline solution through the osmotic membrane into a collecting vessel on the opposite side of the osmotic membrane from which the water is withdrawn in a salt-free state. Because of the excessively large pressure necessary (i.e., more than about 350 p.s.i.) to overcome normal osmotic flow and to reverse the osmotic flow whereby the water of the saline solution is forced to flow through the osmotic membrane in opposition to normal osmotic flow pressure, the excessively large pressure tends to and often does rupture the osmotic membrane which is necessarily a thin membrane through which osmosis would be possible. Various reinforcing efforts usually have failed to satisfactorily avoid the problem of membrane rupture, although various treatments, such as the placing of greater numbers of hydroxy groups on the cellulose acetate membrane, have substantially increased the maximum obtainable flow, such as an increase of from about 13 gallons per square foot per twenty-four hours up to about 22 gal./sq. ft./24 hrs.

Another typical method currently being employed is a vaporization method in which splashing water (containing objectionable material such as salt) produces increased vapor pressure which is subsequently condensed in the form of salt-free water by means of contacting the vapor with a smooth surface whereby the condensed moisture is collected separately from the agitated saline water. Such a process requires sufficient energy to agitate the saline water as well as the heat of vaporization and unfortunately obtains only a very low yield of condensed moisture relative to the time and energy expended. Accordingly, in order to obtain a practical amount of water from such a process, large expenditures of energy are necessary and a large and expensive plant is necessary.

Within recent years, with the development of refined methods of employing atomic energy and in the absence of more satisfactory and economical methods of obtaining salt-free water, nuclear energy has been employed in combination with the distillation method discussed above. However, due to the continued high cost of nuclear energy and the expensive plants and safety controls necessary for its employment, and because nuclear energy plants cannot be randomly employed in every area of need independent of the economics of the situation, atomic energy has not provided the answer to the continuing need for a practical and economical source of salt-free water.

OBJECTS

It is an object of this invention to provide a process for obtaining a solvent which is free of objectionable solute in solution therein.

Another object is to obtain a process which does not require large expenditures of energy.

Another object of this invention is to obtain water which is free of objectionable salts and/or objectionable minerals in solution therein.

Another object is to obtain a process for producing water which is free of objectionable salt, on a large scale production of the salt-free water.

Another object is to obtain a process for producing water which is free of objectionable salt dissolved therein, at a sufficiently low cost that the process is economically feasible for large scale production of salt-free water.

Another object is to obtain a process for producing water which is free of objectionable salt dissolved therein, which process does not require a large and/or expensive plant facility.

Another object is to obtain a process for producing water which is free of objectionable salt dissolved therein, which may be employed in diverse locations in the world irrespective of the lack of conventional power resources.

Other objects become apparent from the above and following disclosure.

SUMMARY OF INVENTION

The objects of this invention are obtained by a process which employs natural osmosis through a semipermeable membrane. By the process of this invention, a highly concentrated solution or slurry is prepared in which the solute employed, in the preparing of the prepared solution or slurry, is a solute which can be removed readily from the aqueous solution formed by the water entering into the prepared solution by osmosis through the semipermeable membrane in contact with the prepared solution.

Accordingly, the water in the saline solution flows through the osmotic membrane by osmosis into the more concentrated prepared solution or slurry, and the increased volume of the prepared solution is thereafter removed from contact with the osmotic membrane; the solute of the prepared volume of the prepared solution is thereafter removed from solution by employment of the appropriate means for the particular solute employed.

THE FIGURE

Although there may be many variations of the method described above, a preferred process is illustrated in the figure as a flow chart. The figure discloses a process in which sea water is placed adjacent to and in intimate contact with a semipermeable membrane having a prepared solution on the opposite side and in intimate contact with the opposite side of the permeable membrane, the prepared solution being more concentrated (having a higher concentration of solute) than the sea water containing the undsirable salts as solute. As water passes through the semipermeable membrane into the prepared solution, the volume of the prepared solution thereby increases. As the volume of the prepared solution increases, the prepared solution tends to become less concentrated. In the embodiment illustrated in the figure, solute is added to the prepared solution at a rate substantially equal to the rate at which the prepared solution tends to become less concentrated by nature of the osmotic water flowing thereinto. Also, as the prepared solution increases in volume, an everflow means is employed whereby the increasing volume overflows into a second and separate container for prepared solution. Thereafter, the separated second solution is subjected to a suitable reaction or to suitable conditions such as temperature and/or pressure, or to a combination of such suitable conditions whereby the solute in the now separately contained prepared solution is separated from the solvent of the solution thereof, leaving the substantially pure solvent, free of and free from objectionable solute such as the salts of the sea water solution.

DETAILED DESCRIPTION

In the employment of solute to prepare the prepared solution into which the water will flow by osmosis from the sea water, it is within the scope of this invention to employ any solute which may be removed by conventional reactions or by subjection to conventional changes in physical conditions such as changes in temperature and/or pressure, for example.

The preferred solutes of this invention are such that, after separation from the prepared solution, they may be repeatedly employed in a cyclic process. Other preferred solutes of this invention may be removed from the prepared solution by converting the solute into other useful components or other reaction side-products.

The invention includes the extraction of any solvent from any solution by the osmotic process of this invention, so long as the solvent of the solution is adaptable to osmosis through an appropriate membrane. Thereby, for solvent contained in a solution of undesirable solute or where it is merely desirable to obtain solvent from such a solution, the solvent is extracted by means of the employment of the osmotic membrane process described above, in which a more concentrated prepared solution osmotically attracts the solvent to be extracted.

As discussed above, the greater utility of the present invention appears to lie in the extraction of salt-free (free of objectionable salt) water from the sea water.

Depending upon the solvent to be extracted, a suitable osmotic membrane is to be employed. In the extraction of water from sea water, any conventional osmotic type membrane or any membrane found to be suitable for osmosis may be employed. Typical membranes include, for example, membranes such as natural animal bladder, cellulose acetate, as many of the various typically conventional prior art synthetic resins in membrane form suitable for osmosis therethrough.

The prepared solution into which the extracted water flows by osmosis from the sea water on the opposite side of the membrance may be prepared from any solvent in which the solute is soluble.

In the embodiment of this invention in which the extracted water is not to be employed for drinking purposes, and therefore does not have to be palatable, non-aqueous solvents may readily be employed for preparing the prepared solution. Preferably such solvents would be incompatible with water, whereby the water would tend to separate from the solvent of the prepared solution and thereby could more easily be withdrawn to a separate container from which the solute contained therein could be removed. Typical solvents which are substantially immiscible with water, and therefore may be employed in this embodiment, include benzene, chloroform, hexane, liquid aliphatic hydrocarbons, 2-ethyl heptane, branched chain aliphatic hydrocarbons, carbon tetrachloride, chloro-substituted aliphatic, alicyclic and/or cyclic aliphatic hydrocarbons, kerosene, petroleum distillates, toluene, aromatic hydrocarbons, and the like.

In the preferred embodiment of this invention, the solvent employed in preparing the prepared solution or prepared slurry is water.

The means employed to remove the solute from the prepared solution or slurry will depend upon the particular solute employed. Typical methods of removal include the employment of chemical reaction, precipitation, evaporation, filtration, centrifugal action, the evolution of a gas, any combination of these, and the like.

In one embodiment of this invention, the solute of the prepared solution includes compounds which are characterized by a marked change in their solubilities upon a change in temperature or pressure of their water solutions, for example. Typical illustrative compounds include those which are soluble in cool water but insoluble in hot water, for example, such as: valeric acids; 1-vicine $$(C_{10}H_{16}O_7N_4)$$

coquimbite(ic) $(Fe_2(SO_4)_2 \cdot 9H_2O)$; manganic acid $$(HMnO_4)$$

Manganese kept acid (hept manganic—$HMn_2O_7$—red oil; tropin; chloroplatinate 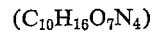 $(((C_8H_{15}N)HCl)_2PtCl_4)$; glucurone; glucuronic acid; lactone of the formula $C_5H_8O_4COO$; treonine $(C_{12}H_{14}N_4OS)$; eitrulline $$(H_2NCON(CH_2)_3C(NH_2)HCOOH)$$

magnesium permanganate $(Mg(MnO_4)_2 \cdot 6H_2O)$; and the like. There are many salts or other materials (solutes) which are soluble in hot water but insoluble in cold water, this being the normally expected phenomenon, and these compositions are far too numerous to list all of such operative compositions; therefore, the International Criticality Tables on Solubility, the last edition as of this date, are hereby incorporated by reference, as an intimate and integral part of the disclosure of this invention; however, typical illustrative examples include: barium chlorate; calcium cinnamylate; ferro-phospho-lactate; calcium borate $(Ca(BO_2)_2 \cdot 2H_2O)$; cesium chlorate; potassium chlorate; nickel chlorate; sodium chlorate; thallium chlorate; ammonium aluminum sulfate $(NH_4Al(SO_4)_2)$; lithium borate; barium hydroxide; cesium nitrate; lead dichloride—cotunnite; lead nitrate; lead acetate; betaine permanganate; calcium fluoride/$H_2CO_3$ solution; bromide of mercury such as mercuric bromide; mercuric sulfate—basic; mercuric chloride; nickel ammonium sulfate $$(NiSO_4 \cdot (NH_4)_2SO_4)$$

potassium dichromate; potassium nitrate—salt peter; potassium perchlorate; potassium (acid) tartrate $$(KHC_4H_4O_6)$$

potassium tellurate; rubidium nitrate; rubidium perchlorate; sodium carbonate—Sal soda ($Na_2CO_3 \cdot 10H_2O$) sodium pyrophosphate; sodium selenate ($Na_2SeO_4 \cdot 10H_2O$); sodium pyrophosphate; sodium selenate $$(Na_2SeO_4 \cdot 10H_2O)$$

thallium nitrate—ous; aluminum potassium sulfate; aluminum sulfate·potassium sulfate(alum-kalinite); and the like.

Convenient reactions to achieve the production of precipitates and the like from the prepared removable second solute typically include the production of carbonate and/or sulfate insoluble precipitate(s) and the like. Examples I, III, VI, and VII are specific illustrations of the production of insoluble carbonates, and Examples II and IV are specific illustrations of the production of insoluble sulfates. Also, Example VIII illustrates an insoluble sulfate precipitate production.

Another typical embodiment employs as the removable second solute a composition such as a removable metal compound or salt which is soluble in water but which when reacted with a selected metal carbonate (or other suitable salt) forms typically a double precipitate; typical of such removable metal compounds or salts are: ferric sulfate; aluminum tannate; ferric albumate; ferric oxalate; aluminum sulfate (such as $Al_2(SO_4)_3 \cdot 18H_2O$); ferric maleate; scandium sulfate; ferric chlorohydrosulfate; ferric tartrate; ferric chromate ($Fe_2(CrO_4)_2 \cdot xH_2O$); aluminum tartrate; aluminum oxalate; ferric tannate; gallium sulfate; and the like. Each of iron and aluminum compounds are preferred because of supplemental advantages of anti-bacterial and anti-virus action of the iron and/or aluminum ions. Typical preferably carbonate salts (to be reacted with the second, separable solute(s)) include: one or more carbonates of calcium, barium, magnesium, berrillium, mercuric ions, mercurous ions, and the like. Other compositions and/or compounds typically include calcium hydroxide, barium hydroxide, barium phosphate, magnesium pyrophosphate, mercuric phosphate, calcium monetite, calcium phosphate, and the like. In order for the metal carbonate (for example), to react with the second separable (removable) solute, the carbonate compound must be at least slightly soluble at the pH at which a reaction would produce an insoluble precipitate. For example, calcium hydroxide is slightly soluble in water, and in alkaline pH; thus, it may be effectively employed when the pH produced by (as a result of) an aqueous solution of a particular separable solute is pH 7 or slightly on the plus side of pH 7; however, also, a prepared solution of separable solute inherently having an acid (slightly acid) pH, such as ferric sulfate, may be rendered neutral or alkaline by addition of a suitable soluble base or other soluble alkaline material. Normally however, when a separable solute in aqueous solution has an acid pH, it is advantageous to employ typically a carbonate or hydroxide which is soluble in an acid (or slightly acid) pH.

In a preferred process, for the prepared solution of ferric sulfate, to form a double precipitate and thereby remove substantially all ferric sulfate, it is advantageous to add an excess of calcium carbonate or lime, in a preferably powdered state, to thereby produce a precipitate of (probably) ferric carbonate and calcium sulfate and/or a complex thereof, which is merely thereafter filtered to obtain potable water, employing any one or more suitable and/or conventional filter, and/or filter system, and/or sand bed, and/or the like, such as for example are typically set forth in U.S. Pat. No. 3,399,136, and/or U.S. Pat. No. 3,259,571, and/or U.S. Pat. No. 3,235,489, and the like.

For possible residual ferric ions, the treated water may be aerated and/or subjected to additional treatment such as with calcium hydroxide which conveniently is sufficiently soluble in the treated water sufficiently free of iron ions to have a pH of about pH 7, that the remaining iron ions are precipitated by the calcium hydroxide.

In another typical embodiment, either barium hydroxide or barium carbonate may be added to the second, separable solution of ferric sulfate and/or aluminum oxalate and/or the like, to produce the double precipitate, such as follows:

(a) $Ba(OH)_2$ plus $Fe_2(SO_4)_3$ yields $BaSO_4$ precipitate and $Fe(OH)_3$ precip. or (b) $Ba(OH)_2$ plus $Al_2(C_2O_4O)_3$ yields $BaC_2O_4$ precip. and $Al(OH)_3$ precip. or (c) $BaCO_3$ plus $Fe_2(SO_4)_3$ yields $BaSO_4$ precip. and $Fe_2(CO_3)_3$ precip. or (d) $BaCO_3$ plus $Al_2(C_2O_4)_3$ yields $BaC_2O_4$ precip. and $Al_2(CO_3)_3$ precip.

A typical cyclic process is exemplified by "a" reaction above; after filtration, the double precipitate of $BaSO_4$ and $Fe(OH)_3$, or complex thereof, is treated with aqueous sulfuric acid solution to leave, after filtration thereof, a residue of the barium sulfate and a filtrate of ferric sulfate. The barium sulfate may be heated to produce barium oxide, and the evolved sulfur trioxide gas may be combined with water to form aqueous sulfuric acid solution. The barium oxide when added to the separated prepared osmotic aqueous solution again forms barium hydroxide, which thereafter may again be reacted with iron sulfate; etc.

Typical additive phosphates include calcium phosphate, barium phosphate, dicalcium phosphate, calcium metaphosphate, monocalcium phosphate, calcium pyrophosphate, tricalcium phosphate, monetite, trancelite, and the like. For example, $Ca_3(PO_4)_2$ when added to the separable solute $Fe_2(SO_4)_3$ produces the double precipitate $CaSO_4$ and $FePO_4$. Similarly, any suitable salt either as the soluble, second, separable solute or as the salt being added to precipitate the separable solute, may include salts of metals such as Ca, Mg, Ba, Be, Hg, Fe, Se, Al, La, Ga, In, and the like.

In another typical embodiment the "treating" of the prepared solution to thereby remove the second, separable solute comprises the employment of a conventional or other suitable electrodialysis and/or ion-exchange apparatus and method, such as the ion-exchange and electrodialysis methods referred to in the preceeding "Background" above.

In another embodiment, the treating step comprises the employment of a soluble phosphate as the second, separable solute, and employs a sorption process such as conventional or other sorption processes. In a typical conventional sorption process, the phosphate salt-containing aqueous solution is passed through a column of activated alumina. Caustic and/or nitric acid are employed to regenerate the alumina. Sorption processes have removal efficiency normally up to about 90 percent without adding salts to the water or without changing its pH.

It should further be noted that the choice of solute, as well as the choice of solvent, to be employed in the prepared, second, separable solute-solution is determined by the use to which the extracted water is to be put. For example, if water is to be employed as drinking water, the solvent and solute of the prepared solution should be such that the palatable characteristics of the extracted water will not be impaired. Alternatively, if the water is not to be employed for drinking purposes, the choice of solute and solvent is such as not to impair the use of the water for its intended purpose, such as for industrial or agricultural use of some type, for example. The choice would take into consideration that some of the solute and/or solvent employed in the prepared solution might be retained to some degree in the water which was subsequently substantially separated therefrom.

Because of the use of natural osmetic force to bring about the solvent separation from the undesirable solute, particularly in the separation of palatable water from sea water, the osmotic process of this invention is adaptable to a small portable unit, which would necessarily take longer a period of time to produce a high yield, than would a larger unit. Alternatively, the process is adaptable to larger areas of osmotic permeable membranes, etc.

A typical apparatus for practicing the process of this invention comprises: (1) a source of a first solution comprising a solvent and a solute contained therein in solution, said source being adjacent to (2) an osmotic membrane in a manner whereby said first solution is in intimate contact with one surface of said osmotic membrane, (3) a second solution comprising a solvent having a solute dissolved therein in an amount of solute:solvent ratio greater than solute:solvent ratio of said first solution, said second solution being in intimate contact with the opposite surface of said osmotic membrane and separate from said first solution, and (4) a means for withdrawing at least a portion of said second solution, including a means, where desirable, to separate the solvent from the solute of said withdrawn second solution.

The following examples are given by way of illustrating the invention and are in no way intended to limit the scope thereof, except as limited in the appended claims.

EXAMPLE I

Calcium oxide (CaO) is reacted with water to produce calcium hydroxide ($Ca(OH)_2$) which is reacted with chlorine or chlorine water to produce (yield): (1) $CaCl_2$, (2) $Ca(OCl)_2$ and (3) water ($H_2O$), and this reaction product, or the salts, is employed in the desired concentration as the second prepared solution of this invention, into which water flows by osmosis from another solution having a lesser solute concentration. As water flows into the prepared second solution, the increasing volume overflows through an overflow means and is collected. Carbon dioxide is added either in gaseous or solution form to the collected overflow water, sufficiently to produce calcium carbonate precipitate, water, and chlorine gas, and the precipitate is filtered therefrom. The chlorine content of the water serves to purify the water, but if desired it may be substantially removed by heating, or by other equivalent means such as aeration. The calcium carbonate precipitate may be reemployed in the process by heating to reconvert to CaO and carbon dioxide. Similarly, the chlorine gas may be collected and reemployed in the process. Thereby, the cyclic process is economical. The water obtained when calcium carbonate is filtered therefrom and/or subsequent to the filtration when chlorine is driven therefrom, is substantially solute-free and substantially palatable water.

EXAMPLE II

Water is reacted with chlorine gas in a manner to produce Hcl and HClO, to which barium hydroxide is added and reacted to produce (1) $BaCl_2$, (2) $Ba(ClO)_2$, and (3) water; this reaction product, or the salts, is (are) employed as the second solution of this invention into which flows water by osmosis from a solution containing a lower concentration of solute. To the collected overflow water, sulfuric acid is reacted (two molecules of the acid) to produce two molecules of barium sulfate precipitate, water, and chlorine gas. In a manner similar to Example I, after filtration, the barium sulfate may be reemployed, as well as the chlorine gas. The filtered water is substantially palatable.

EXAMPLE III

Calcium oxide is reacted with water to produce calcium hydroxide, as in Example I; the calcium hydroxide is reacted with chloric acid ($2HClO_3 \cdot 7H_2O$) to produce: (1) $Ca(ClO_3)_2 \cdot 2H_2O$, and water ($7H_2O$), which is employed as the second solution into which water flows by osmosis. To the collected overflow solution, carbon dioxide is added, or alternatively carbonic acid ($H_2CO_3$) is added, to produce calcium carbonate precipitate and $2HClO_3$; as known in the prior art, to initiate the preceding reaction to form this precipitate, the solution must be at pH 7 or slightly more than pH 7, by the use of $CaCO_3$ in excess in the solution, or any other alkaline material in an amount necessary to adjust the pH as desired. The carbonate added and the carbonate precipitate are filtered therefrom, and upon heating, the $HClO_3$ in the filter is given off as chlorine gas and as oxygen, both of which serve to purify the palatable water, and the gases may be collected for reuse or for sale.

EXAMPLE IV

This example is analogous to the above Example III, except that barium hydroxide is substituted for calcium hydroxide, and chloric acid is reacted therewith to produce the preferred solution; and to the collected overflow solution, sulfuric acid is reacted to produce barium sulfate pricipitate which is removed by filtration, and $2HClO_3$ as in the preceeding example.

EXAMPLE V

By a decomposition method, $8HClO_3$ is employed to produce: (1) $4HClO_4$, (2) $2Cl_2$, (3) $2H_2O$, and (4) $3(O_2)$ gas. Using appropriate safety precautions, potassium is reacted with $2HClO_4$ to produce $2KClO_4$ and hydrogen gas.

The hydrogen gas may be sold, and the $KClO_4$ is employed as the second solution separable solute into which water flows by osmosis. If in the reaction product above, or the potassium salt therefrom, there is a side product of $HClO_3$, the subsequent reaction thereof will in any event eventually produce $HClO_4$; for example, $4HClO_3$ breaks down into $2HClO_2$ and $2HClO_4$, and the $HClO_2$ breaks down into any of (1) HClO and $2HClO_3$, or (2) $H_2O$ and $ClO_2$—which is unstable, or (3) HCl and $2HClO_3$, the HCl reacting with the HClO to produce water and chlorine gas. Alternatively, the $KClO_4$ may be prepared by any conventional method. It should be noted that $KClO_4$ is recognized as the least soluble in water of the perchlorates. Mild warming of the solution increases solubility. By sufficiently lowering the temperature of the collected solution (i.e. the modified solution containing the water of osmosis), the $KClO_4$ may be separated from the water by appropriate means, because of the insolubility of the $KClO_4$.

EXAMPLE VI

Calcium hypochlorite ($Ca(ClO)_2 \cdot 2H_2O$) is employed to prepare the prepared solution into which water will flow by osmosis. The calcium hypochlorite may be prepared by reacting chlorine gas ($Cl_2$) with calcium hydroxide, or alternatively may be produced by any conventional method known in the art. To the collected solution (overflow solution) is added carbon dioxide gas ($CO_2$) or a solution thereof as carbonic acid, to produce calcium carbonate precipitate ($CaCO_3$), chlorine gas, which may be collected, and water ($4H_2O$).

EXAMPLE VII

As an illustration of the high degree of efficiency in the removal of sepaarble solutes such as typically aluminum sulfate or ferric sulfate, a relatively concentrated water solution of ferric sulfate was prepared. Powdered calcium carbonate in an excessive amount was admixed at room temperature with the water solution of ferric sulfate, a few minutes allowed for reaction, and the mixture thereafter filtered twice through a conventional paper filter, utilizing a partial vacuum to accelerate the rate of filtration. A test of the water filtrate for the presence of iron ions proved that substantially all iron ions had been removed from the water, with an estimated (based on "indicator" pale color) remaining iron ion concentration of about 3 to 10 parts per million.

Accordingly, Example VII proves the high degree of effectiveness in the removal of concentrated ferric sulfate from water by addition of calcium carbonate in excess.

EXAMPLE VIII

Any one or more compounds which are soluble in cool water but insoluble in hot water is (are) employed in preparing the prepared solution into which the water flows by osmosis from the solution containing less solute concentration. The collected overflow solution is caused to increase in temperature, whereby the solute becomes insoluble, and the insoluble solute is substantially simultaneously or is thereafter separated from the solute-free diluent (solvent—water in this case) by the employment of appropriate means for separating the particular solute. The solutes which are insoluble in hot water are discussed at length above.

It is to be noted that any one or more of the typical embodiments of this invention may be combined whereby the process is more effective than employing only a single solute and/or diluent (solvent) for the preparation of the prepared solution into which the osmosis will take place.

Also, it should be noted that although this invention is concerned primarily with the momentous problem of obtaining palatable and/or commercially usable water from an abundant source as sea water, by a method which is sufficiently economical, efficient, and which does not necessarily require a large plant facility, the method of this invention may be employed to separate efficiently a valuable solute from the solvent in which it is dissolved and in which, for example, the valuable solute is present in such low concentration that other methods of separation are not economically feasible.

In any one or more of the above examples illustrating various embodiments of this invention, any conventional method may be employed in the preparation of the particular solute employed.

For instance, in a slight but obvious variation within the scope of the process of this invention, instead of withdrawing the diluted prepared solution from contact with the osmotic membrane, prior to precipitation of the removable prepared solution solute, as an alternative the first solution such as sea-water salt solution may be removed from contact with the osmotic membrane, and the diluted solution while still remaining in contact with the membrane may have the separable (removable) solute removed by a suitable treatment. With the sea water not in contact with the membrane, there is eliminated the possibility that the effluent water would undergo osmosis back into the sea water at the moment that the separable solute is precipitated or otherwise removed from the prepared solution.

Still another variation would not require removal of either solution, i.e. neither the sea water nor the prepared solution, prior to precipitation. In this variation, reasonably soon after precipitation or other removal of the separable solute, the salt-free (or solute-free) water is removed from contact with the osmotic membrane; this would be possible without any significant nor appreciable loss of water by osmosis since osmosis does not proceed at that rapid a rate.

What I claim is:

1. A process for separating a solvent from a solute dissolved therein, said process comprising (1) placing a first solution comprising a first solvent and a first solute contained therein, into intimate contact with a first side of a semi-permeable membrane suitable for osmosis, (2) placing a second solution comprising a solvent having a second separable solute dissolved therein, into intimate contact with an opposite second side of said semi-permeable membrane, separate from said first solution and free of said first solute, (3) passing, by osmosis, said first solvent of said first solution through said semi-permeable membrane into said second solution, said passing comprising dissolving said second solute in said second solvent in an amount sufficient that solute:solvent ratio of said second solution is sufficiently greater than solute:solvent ratio of said first solution that osmosis takes place from said first solution to said second solution, and said passing being sufficient to produce a modified second solution which thereby includes at least a minor amount of said first solvent, (4) adding an additional amount of said substantially separable second solute at a rate sufficient to maintain a substantially constant degree of concentration of said second solute in said second solvent as said passing by osmosis takes place, and (5) treating said modified second solution sufficiently to substantially separate said second substantially separable second solute from said first solvent in a liquid phase, of said modified second solution, said second solute being substantially non-volatile.

2. A process according to claim 1, including withdrawing from contact with said semi-permeable membrane at least a portion of said modified second solution, and said treating comprising treating said withdrawn modified second solution.

3. A process for separating water of an aqueous solvent from a solute dissolved therein, said process comprising (1) placing a first solution comprising an aqueous first solvent and a first solute contained therein, into intimate contact with a first side of a semi-permeable membrane suitable for osmosis, (2) placing a second solution comprising a solvent having a second, separable, substantially non-volatile solute dissolved therein, into intimate contact with an opposite second side of said semi-permeable membrane, separate from said first solution and free of said first solute, (3) passing, by osmosis, water of said aqueous first solvent of said first solution through said semi-permeable membrane into said second solution, said passing comprising dissolving said second solute into said second solvent in an amount sufficient that solute:solvent ratio of said second solution is sufficiently greater than solute:solvent ratio of said first solution that osmosis of water takes place from said first solution to said second solution, and said passing being sufficient to produce a modified aqueous second solution which thereby includes at least a minor amount of water of said aqueous first solvent, and (4) treating said aqueous second solution, sufficiently to substantially separate said second substantially non-volatile solute from each of the water in a liquid state and said second solvent of said aqueous solution and sufficiently to substantially isolate said water in a liquid phase from said separated solute.

4. A process according to claim 3, including withdrawing from contact with said semi-permeable membrane at least a portion of said modified aqueous second solution, and said treating comprising treating said withdrawn modified aqueous second solution.

5. A process according to claim 4, in which said first solution comprises substantially sea water containing sea salts dissolved therein, and said second solvent comprises substantially a non-aqueous solvent characterized by a property of tending to separate from water when admixed therewith.

6. A process according to claim 4, in which said treating includes changing the temperature sufficiently that said second substantially non-volatile solute precipitates.

7. A process according to claim 4, in which said substantially non-volatile solute is sufficiently separable from said second solvent that said isolated water is palatable.

8. A process according to claim 4, including withdrawing from contact with said semi-permeable membrane said first solution prior to said treating, and said treating comprising treating said modified aqueous solution after said withdrawal of said first solution.

9. A process according to claim 4, in which said treating includes employing an ion-exchange process sufficintly to substantially remove said second substantially non-volatile solute.

10. A process according to claim 4, in which said treating includes employing an electrodialysis process sufficiently to substantially remove said substantially non-volatile solute.

11. A process according to claim 4, in which said treating includes employing a sorption process, and in which said second, separable solute is a phosphate salt.

12. A process according to claim 4, in which said first solution comprises substantially sea water containing sea salts dissolved therein and in which said second solvent comprises substantially water.

13. A process according to claim 12, including adding an additional amount of said substantially non-volatile separable second solute at a rate sufficient to maintain a substantially constant degree of concentration of said second solute in said second solvent as said passing by osmosis takes place.

14. A process according to claim 12, in which said treating comprises decreasing the temperature sufficiently that said second solute precipitates from said water.

15. A process according to claim 12, in which said treating comprises adding a carbonate in the form of carbon dioxide sufficiently to form a carbonate precipitate.

16. A process according to claim 12, in which said treating comprises increasing the temperature thereof sufficiently that said solute precipitates from said water.

17. A process according to claim 16, in which said second solute is selected from the group consisting of valeric acid, 1-vicine, coquimbite, manganic acid, manganese hept acid, tropin, tetrachloroplatinate, glucurone, glucuronic acid, lactone of the formula

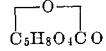

treonine, citrulline, and magnesium permanganate.

18. A process according to claim 12, in which said second solute comprises a water-soluble inorganic salt which forms a water-insoluble precipitate when reacted with a carbonate.

19. A process according to claim 18, in which said water-soluble inorganic salt is a calcium salt.

20. A process according to claim 18, in which said inorgnaic salt has the formula $M(OCl)_x$, in which said M is a metal and $x$ is the valence of the metal.

21. A process according to claim 18, in which said water-soluble inorganic salt is a metal salt of a metal selected from the group consisting of aluminum, iron, scandium, lanthanum, gallium, and indium, and said treating includes adding a carbonate salt of a metal which forms a water-insoluble precipitate when reacted with said water-soluble inorganic salt contained in said second-solvent water.

22. A process according to claim 12, in which said second solute comprises a water insoluble inorganic salt which forms a water-insoluble precipitate when reacted with a sulfate.

23. A process according to claim 22, in which said water-soluble inorganic salt is a barium salt.

24. A process according to claim 22, in which said water-soluble inorganic salt has the formula $$M(OCl_3)_x \cdot 2H_2O$$

in which M is a metal and $x$ is the valence of the metal.

25. A process according to claim 12, in which said treating comprises adding a sulfate composition sufficiently to form a sulfate precipitate.

26. A process according to claim 25, in which said sulfate composition comprises substantially sulfuric acid.

References Cited

UNITED STATES PATENTS

| | | |
|---|---|---|
| 3,130,156 | 4/1964 | Neff. |
| 3,357,917 | 12/1967 | Humphreys. |
| 3,386,912 | 6/1968 | Lazare. |

REUBEN FRIEDMAN, Primary Examiner

F. A. SPEAR, Jr., Assistant Examiner.

U.S. Cl. X.R.

210—27, 56, 60, 73, 321